US010310584B2

United States Patent
Balasubramanian

(10) Patent No.: US 10,310,584 B2
(45) Date of Patent: *Jun. 4, 2019

(54) INTERCONNECT SERIALIZATION SYSTEM AND METHOD

(71) Applicant: Infineon Technologies AG, Neubiberg (DE)

(72) Inventor: Prakash Kalanjeri Balasubramanian, Bangalore (IN)

(73) Assignee: Infineon Technologies AG, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/131,895

(22) Filed: Sep. 14, 2018

(65) Prior Publication Data

US 2019/0018470 A1 Jan. 17, 2019

Related U.S. Application Data

(63) Continuation of application No. 14/955,998, filed on Dec. 1, 2015, now Pat. No. 10,095,301.

(51) Int. Cl.

| | |
|---|---|
| *G06F 13/36* | (2006.01) |
| *G06F 13/38* | (2006.01) |
| *G06F 13/40* | (2006.01) |
| *G06F 13/20* | (2006.01) |
| *G06F 1/324* | (2019.01) |
| *G06F 1/3296* | (2019.01) |
| *G06F 15/78* | (2006.01) |
| *G06F 13/42* | (2006.01) |

(52) U.S. Cl.
CPC ............ *G06F 1/324* (2013.01); *G06F 1/3296* (2013.01); *G06F 13/4022* (2013.01); *G06F 13/4282* (2013.01); *G06F 15/7807* (2013.01); *Y02D 10/126* (2018.01); *Y02D 10/151* (2018.01); *Y02D 10/172* (2018.01)

(58) Field of Classification Search
CPC .......... G06F 13/36; G06F 13/38; G06F 13/40; G06F 13/20
See application file for complete search history.

(56) References Cited

U.S. PATENT DOCUMENTS

| | | | |
|---|---|---|---|
| 6,658,514 B1 * | 12/2003 | Jones | G06F 13/385 710/260 |
| 2008/0270655 A1 | 10/2008 | Bracamontes Del Toro | |
| 2009/0300568 A1 | 12/2009 | Kuroda | |
| 2012/0113822 A1 | 5/2012 | Letner et al. | |
| 2012/0198266 A1 | 8/2012 | Hofmann et al. | |
| 2017/0060218 A1 | 3/2017 | Zhang et al. | |

* cited by examiner

*Primary Examiner* — David E Martinez
(74) *Attorney, Agent, or Firm* — Schiff Hardin LLP

(57) ABSTRACT

A method and system to reduce power consumption are described. The system can include a first device and a second device of a plurality of devices. The second device can be coupled to the first device via an interconnect. A serialization capability of the first device can be determined. Further, access to the second device one or more of the plurality of devices can be determined. The interconnect can be serialized based on the determined serialization capability and/or the determined access to the second device.

19 Claims, 10 Drawing Sheets

| Outputs 330 | Inputs 325.M | ... | ... | Inputs 325.2 | Inputs 325.1 |
|---|---|---|---|---|---|
| 1 | 0 | 0 | 1 | 1 | 0 |
| 2 | 0 | 0 | 0 | 1 | 0 |
| ... | ... | ... | ... | ... | ... |
| N | 1 | 1 | 1 | 0 | 0 |

INTERCONNECT SERIALIZATION SYSTEM AND METHOD

CROSS REFERENCE TO RELATED APPLICATIONS

This is a continuation patent application of U.S. patent application Ser. No. 14/955,998, filed Dec. 1, 2015, entitled "Interconnect Serialization System and Method," which is incorporated herein by reference in its entirety.

BACKGROUND

Field

Embodiments described herein generally relate to interconnects within a system on chip (SOC), including reducing power consumption of the SOC using interconnect serialization/deserialization.

Related Art

SOCs can include multi-processor configurations having two or more central processing units (CPUs). In operation, applications can issue a performance request to request the SOC to provide a particular voltage and/or frequency to the corresponding CPU in which the application is running. In a conventional SOC, the other CPUs of a SOC will operate at the same voltage and frequency notwithstanding one or more CPUs requesting a lower voltage and/or frequency, thereby resulting in increased power consumption.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The exemplary embodiments of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

Figure 1:
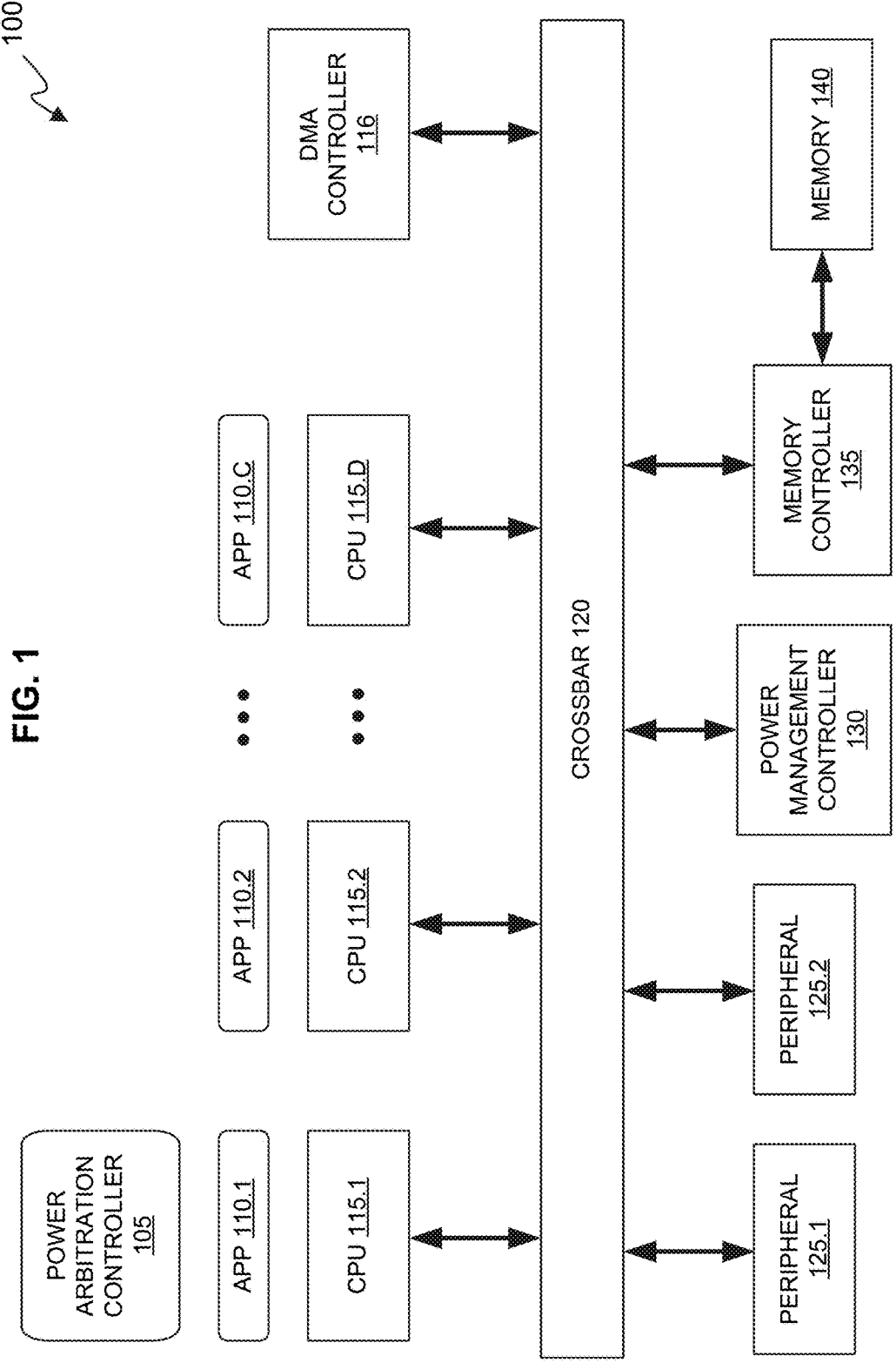
FIG. 1 illustrates a system on chip (SOC) according to an exemplary embodiment of the present disclosure.

FIG. 1 illustrates a system on chip (SOC) 100 according to an exemplary embodiment of the present disclosure. The SOC 100 can include one or more applications 110 running on one or more central processing units (CPUs) 115. The SOC 100 also can include one or more peripheral devices 125 (including, for example, a power management controller 130), a memory controller 135 coupled to a memory 140, and a crossbar 120. In this example, the power management controller 130 and the memory controller 135 are types of peripheral device 125. In operation, the crossbar 120 facilitates communication between a bus master (e.g., CPU 115, DMA Controller 116) and a bus slave (e.g., peripheral 125, memory controller 135). For example, a bus master (e.g., CPU 115) can initiate communication with a bus slave (e.g., peripheral 125) over the crossbar 120 and the chosen bus slave provided a response to the bus master via the crossbar 120. In an exemplary embodiment, the power management controller 130 is one of the peripheral devices 125. The memory controller 135 can include processor circuitry configured to manage data flow to/from memory 140. The memory 140 can be any well-known volatile and/or non-volatile memory that stores data and/or instructions, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

The applications 110 can include a computer program having one or more instructions that, when executed by a corresponding CPU 115, controls the CPU 115 to perform one or more functions of the corresponding application 110. For example, application 110.1 can run on CPU 115.1, where the CPU 115.1 can execute one or more instructions of application 110.1 to perform the function(s) of the application 110.1.

The CPUs 115 can include processor circuitry configured to execute one or more instructions and/or code of an associated application 110 to perform one or functions of the application 110, execute one or more instructions defined by the power arbitration controller 105 to perform one or more functions of the power arbitration controller 105, perform one or more functions based on one or more instructions stored in memory 140, and/or execute one or more instructions provided by one or more peripheral devices 125 to perform one or more functions associated with the peripheral device(s) 125.

The power arbitration controller 105 can be configured to process one or more performance requests from one or more applications 110 and selectively output one of the performance requests to the power management controller 130. In operation, the power arbitration controller 105 can communicate with applications 110 running on corresponding CPUs 115 to receive the performance requests. In an exemplary embodiment, the power arbitration controller 105 can include one or more computer-executable instructions that, when executed by an associated CPU 115, control the CPU 115 to perform the operations of the power arbitration controller 105.

For example, the power arbitration controller 105 can receive a plurality of performance requests from the applications 110, and can determine which performance request of the plurality of performance requests is the largest (e.g., the performance request having the greatest voltage and/or frequency). That is, the power arbitration controller 105 can determine which one of the performance requests takes precedence over the others. The power arbitration controller 105 can then output the determined performance request to the power management controller 130. In an exemplary embodiment, the power arbitration controller 105 can be configured to calculate a frequency-voltage pair based on the determined performance request and to provide the frequency-voltage pair to the power management controller 130.

In an exemplary embodiment, the power arbitration controller 105 can be implemented on one or more of the CPUs 115, and be configured to communicate with applications 110 running on the other CPUs 115. For example, the power arbitration controller 105 can be implemented on CPU 115.1, where the CPU 115.1 execute one or more instructions defined by the power arbitration controller 105 to cause the CPU 115.1 to perform the functions of the power arbitration controller 105.

The power management controller 130 can include processor circuitry that is configured to control the operating voltage and/or frequency of the CPUs 115. For example, the power management controller 130 can determine the frequency and/or voltage at which the CPU(s) 115 are to operate, and control the CPU(s) 115 to operate at the determined voltage and/or frequency. In an exemplary embodiment, the power management controller 130 can receive a performance request from the power arbitration controller 105. The power management controller 130 can then generate one or more control signals based on the performance request and provide the control signal(s) to the CPU(s) 115 to control the CPU(s) 115 to operate at the voltage and/or frequency specified by the control signal(s). In this example, the control signal(s) correspond to a frequency-voltage pair that define the frequency and/or voltage at which the CPU(s) 115 are to operate. In exemplary embodiments where the power management controller 130 is provided with a frequency-voltage pair from the power arbitration controller 105, the power management controller 130 can generate a control signal corresponding to the received frequency-voltage pair.

Figure 2:
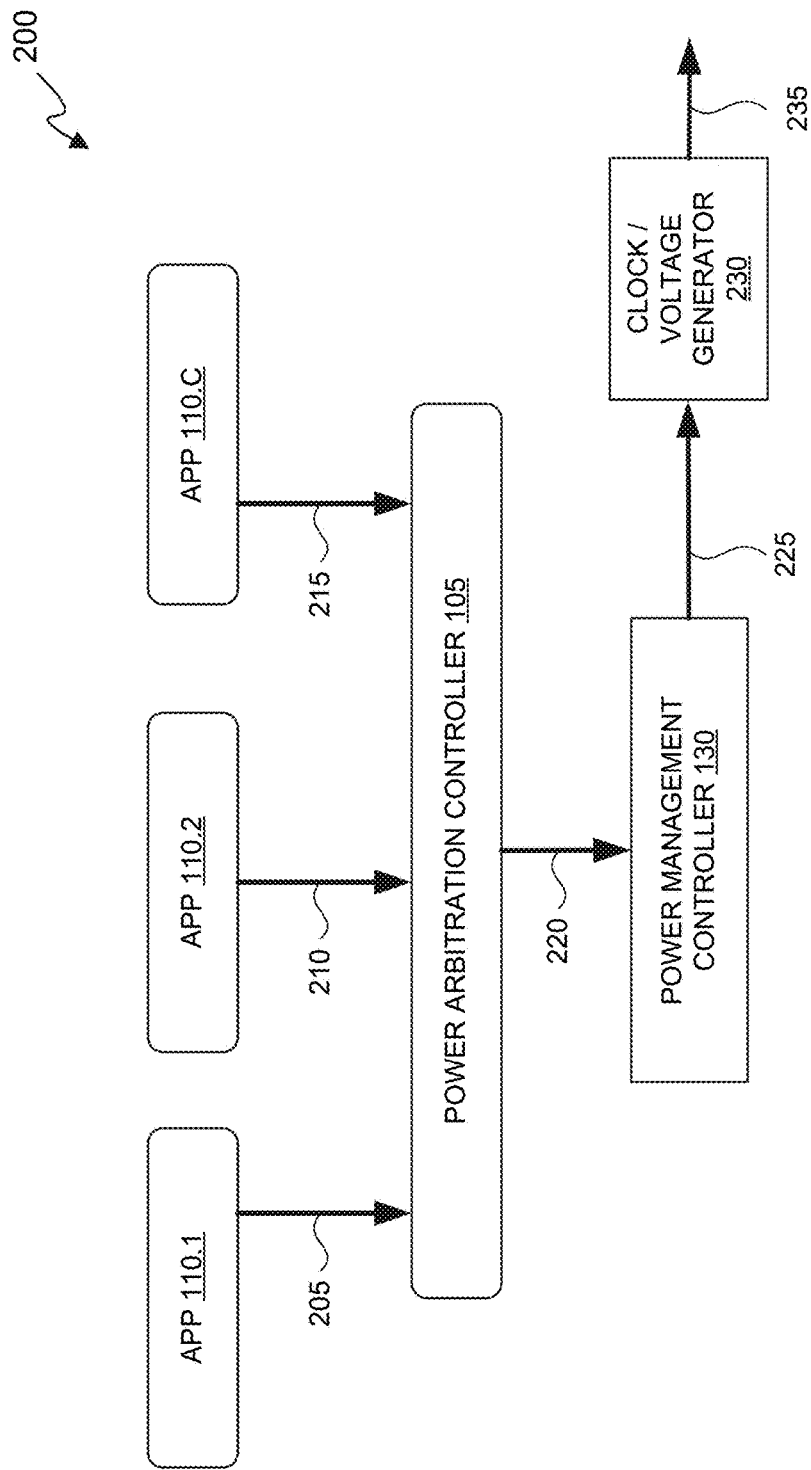
FIG. 2 illustrates an exemplary operation of the power arbitration controller and the power management controller according to exemplary embodiments of the present disclosure.

FIG. 2 illustrates an exemplary operation 200 of the power arbitration controller 105 and the power management controller 130 according to an exemplary embodiment. For example, applications 110.1 to 110C executing on associated CPUs 115 can generate performance requests 205, 210, 215, and provide the performance request(s) to the power arbitration controller 105. The power arbitration controller 105 can determine which of the performance requests 205, 210, 215 is the largest, and can output the determined performance request 220 (e.g., performance request message) to the power management controller 130. For example, if the application 110.1 submits a performance request 205 that requests 5V and a frequency of 64 Hz, and the application 110.2 submits a performance request 210 that requests 2.5V and a frequency of 40 Hz, the power arbitration controller 105 will determine the performance request 220 of 5V and a frequency of 64 Hz must take precedence. The power arbitration controller 105 can provide the determined performance request 220 to the power management controller 130, or can calculate a frequency-voltage pair corresponding to the performance request 220 and provide the frequency-voltage pair to the power management controller 130.

In an exemplary embodiment, the power arbitration controller 105 can also be configured to determine which bus interconnects/data paths of corresponding CPUs 115 are capable of serialization operations. For example, the power arbitration controller 105 can determine which CPUs 115 require serialization to be enabled on their corresponding bus interconnects/data paths. In an exemplary embodiment, the power arbitration controller 105 can be configured to determine a serialization factor that identifies whether the corresponding bus interconnect/data path of a CPU 115 is capable of serialization operations as well as the degree of serialization for the bus interconnect/data path of the CPU 115.

In an exemplary embodiment, the bus interconnects/data paths of corresponding CPUs 115 that are capable of serialization operations can be those bus interconnects/data paths associated with CPUs 115 that have been provided a greater frequency and/or voltage than requested in their corresponding performance request. In this example, the power arbitration controller 105 can determine that the data path corresponding to CPU 115.2 is capable of serialization operations because the CPU 115.2 requested 2.5V and a frequency of 40 Hz but was provided with 5V and a frequency of 60 Hz based on the determined performance request 220. The power arbitration controller 105 can be configured to provide serialization capability information that identifies bus interconnects/data paths of CPUs 115 that are capable of serialization operations to the serialization controller 605 as discussed in more detail below with reference to FIGS. 6-7C.

The power management controller 130 can receive the performance request 220 (e.g., performance request message) from the power arbitration controller 105, and can generate one or more control signals 225 (e.g., performance control signals) based on the performance request 220. In an exemplary embodiment, the performance request 220 can be a voltage-frequency pair or a performance factor that the power arbitration controller 105 can convert into a voltage-frequency pair. The power management controller 130 can provide the control signal(s) 225 to a clock and/or voltage generation circuit 230 configured to generate clock signals 235 having particular frequencies and/or voltages. The voltage and/or frequency of a generated clock signals 235 can be determined based on the control signal(s) 225 received from the power management controller 130. In operation, the generated clock signals 235 can be provided to the CPUs 115 to control the CPUs 115 to operate at the resulting voltages and/or frequencies of the clock signals. In an exemplary embodiment, the clock and/or voltage generation circuit 230 can include processor circuitry configured to generate clock signals 235 with the particular frequencies and/or voltages.

In an exemplary embodiment, because the power management controller 130 is shared by the CPUs 115, the clock signals 235 constrain each of the CPUs 115 to operate at the same or substantially the same voltage and/or frequency. For example, if the CPU 115.1 submits a performance request 205 that requests 5V and a frequency of 64 Hz, and the CPU 115.2 submits a performance request 210 that requests 2.5V and a frequency of 40 Hz, the power arbitration controller 105 will determine the performance request 220 of 5V and a frequency of 64 Hz prevails. The clock signals 235 generated by the clock and/or voltage generation circuit 230 based on the control signals 225 of the power management controller 130 will specify that each of the CPUs 115 will operate at 5V and 64 Hz regardless of the lower voltage/frequency performance request submitted by the CPU 115.1.

The crossbar 120 can include one or more circuits and/or logic configured to connect one or more components of the SOC 100 to one or more other components of the SOC 100. For example, the power management controller 130, memory controller 135, CPUs 115 and peripheral devices 125 can be communicatively and/or electrically coupled to the CPUs 115 and/or DMA controller 116 via the crossbar 120. The crossbar 120 can include one or more bus interconnects/data paths configured to couple the various components to each other. The crossbar 120 can also be referred to as a bus matrix having coupling paths/interconnects between the various components connected to the crossbar 120.

Figure 3:
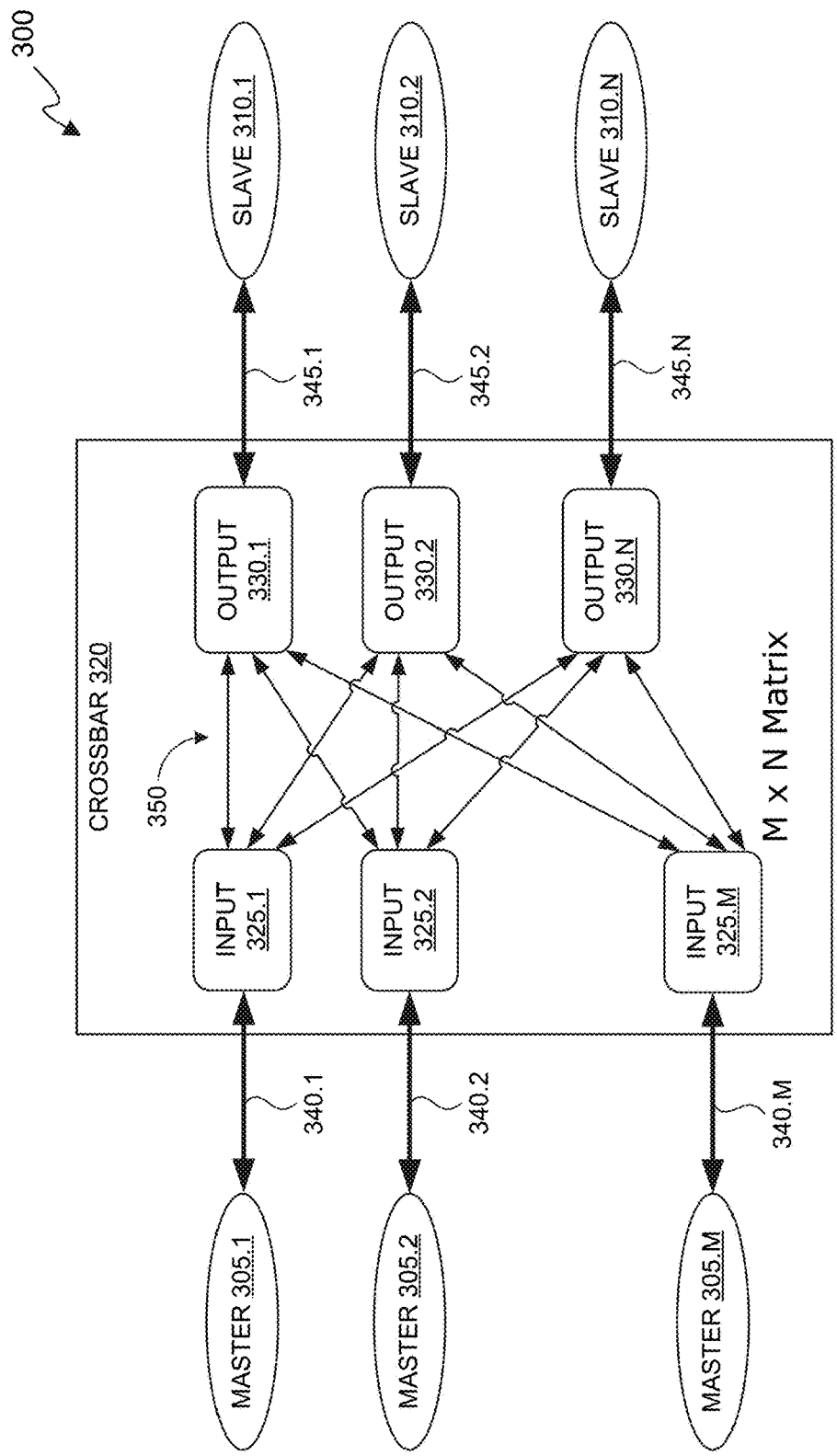
FIG. 3 illustrates a SOC according to an exemplary embodiment of the present disclosure.

FIG. 3 illustrates a SOC 300 according to an exemplary embodiment of the present disclosure. The SOC 300 can include a crossbar 320 configured to communicatively and/or electrically couple one or more master devices 305 (e.g., CPUs 115, DMA controller 116) to one or more slave devices 310 (e.g., peripheral devices 125, power management controller 130, memory controller 135). The crossbar 320 can be an exemplary embodiment of the crossbar 120 of FIG. 1.

The crossbar 320 can include one or more input ports 325.1 to 325.M and one or more output ports 330.1 to 330.N, where M and N can be the same or different positive integer values. One or more of the input ports 325 can be communicatively and/or electrically coupled to one or more output ports 330 via one or more paths/interconnects 350. For example, input port 325.1 is connected to output ports 330.1, 330.2 and 330.N.

The input ports 325 can be connected to a corresponding master device 305 via path 340. The output ports 330 can be connected to a corresponding slave device 310 via path 345. The paths 340, 345, and/or 350 can be multi-bit paths. For example, the paths 340, 345, and/or 350 can be 8 bit, 16 bit, 32 bit, 64 bit, or another bit size as would be understood by those skilled in the relevant arts. The master devices 305 and/or the slave devices 310 can correspond to one or more components of the SOC 100 illustrated in FIG. 1.

Figure 4:
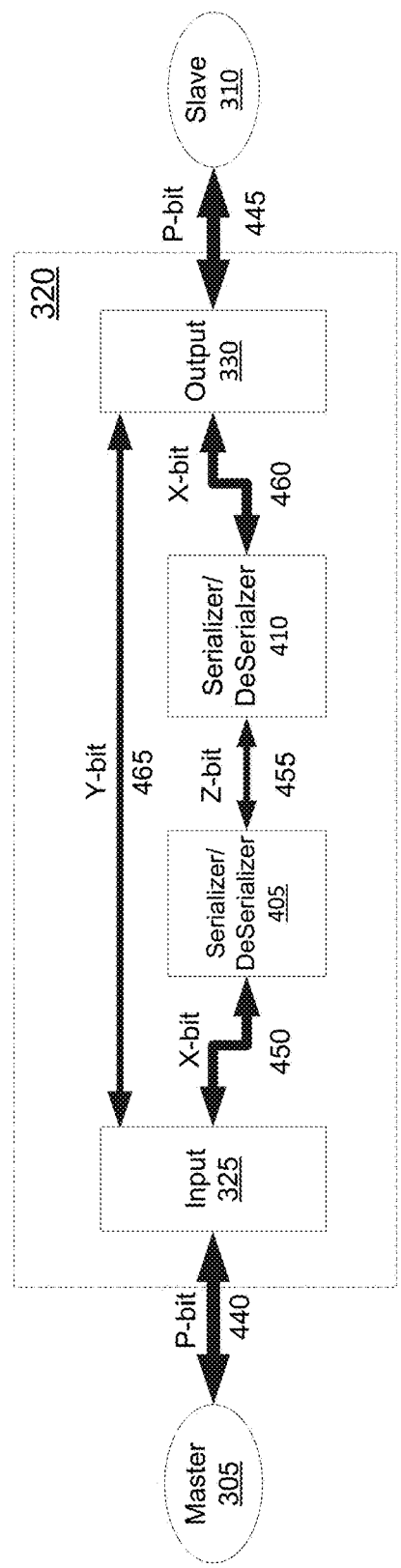
FIG. 4 illustrates the crossbar 320 according to an exemplary embodiment of the present disclosure.

FIG. 4 illustrates the crossbar 320 according to an exemplary embodiment of the present disclosure. For ease of illustration and discussion, the crossbar 320 illustrated in FIG. 4 shows only a single path between an input port 325 and a corresponding output port 330. For example, the crossbar 320 of FIG. 4 can illustrate the connection between input port 325.1 and output port 330.1 via path 350. In this example, the paths 450, 455, 460 and 465 can collectively correspond to path 350 illustrated in FIG. 3. Paths 440 and 445 can correspond to paths 340 and 345, respectively.

In an exemplary embodiment, the crossbar 320 can include one or more serializer/de-serializer pairs 405, 410 disposed between an input port 325 and corresponding output port 330 along path 350. For example one or more of the paths 350 between the various input ports 325 and output ports 330 can include the serializer/de-serializer pairs 405, 410 as illustrated in FIG. 4. In this example, paths 450, 455, 460 and 465 collectively represent path 350.

The serializer/de-serializer 405 and the serializer/de-serializer 410 can include processor circuitry configured to serialize an input signal to generate a serialized output signal. The serializer/de-serializer 405, 410 can also be configured to de-serialize a received serialized input signal to generate a de-serialized output signal.

Paths 440 and 445 are P-bit paths having P single-bit paths (e.g., conductors). The P-bit paths can include X single-bit data paths and Y single-bit paths control, where P=X+Y. For example, paths 450 and 460 can be X-bit paths and path 455 can be a Z-bit path, where Z can be less than or equal to X. In an exemplary embodiment, paths 450 and 460 can each be 64 bit paths, where each 64 bit path includes 64 single-bit paths. The bit path size is not limited to a 64 bit path, and can be other bit values as would be understood by those skilled in the arts. In operation, the serializer/de-serializer 405 and the serializer/de-serializer 410 can serialize the path 455 between the serializer/de-serializer 405 and the serializer/de-serializer 410 to form, for example, a 32 bit path having 32 single-bit paths. For example, the serializer/de-serializer 405 and the serializer/de-serializer 410 can electrically disconnect half of the 64 single-bit paths (i.e., 32 single-bit paths/conductors) to convert the path 455 from a 64-bit path to a 32-bit path having 32 single-bit paths. That is, the X-bit paths 450, 460 can 64-bit paths (e.g., X=64) and the Z-bit path 455 can be serialized to have 32 single-bit paths/conductors (e.g., Z=32). In this example, if 64 bit data is transmitted per clock cycle, the transmission of data between the serializer/de-serializer pairs 405, 410 along path 455 will use two clock cycles as the path 455 has been reduced to a 32 bit path.

In an exemplary embodiment, the serializer/de-serializer pairs 405, 410 can serialize/de-serialize the path 455 to, for example an 8 bit, 16 bit, 32 bit, 64 bit, or another bit size as would be understood by those skilled in the relevant arts. Although reducing the bit size of the path reduces the data throughput of the path, the reduction in bit size reduces the total capacitance of the path as described in detail with reference to FIGS. 5A and 5B.

Figure 5A:
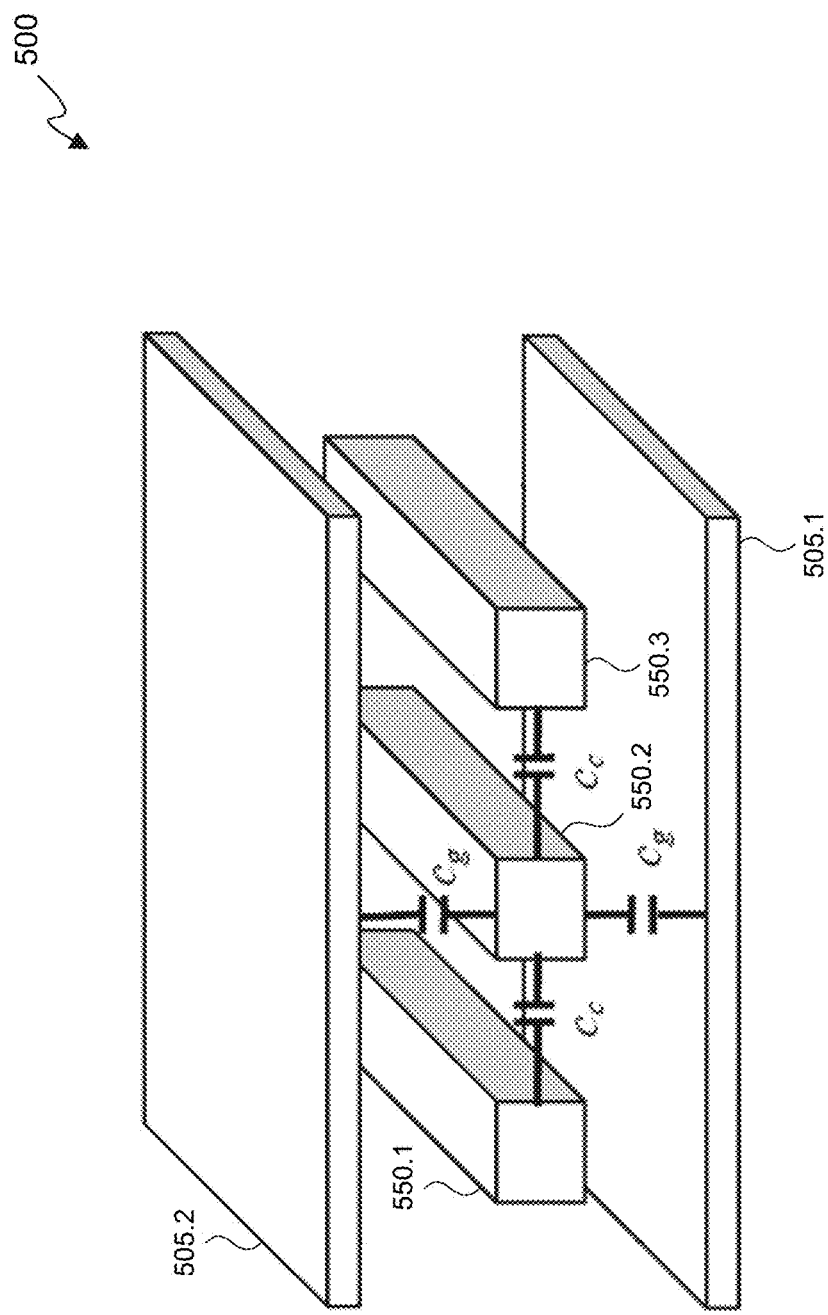
FIG. 5A illustrates a path according to an exemplary embodiment of the present disclosure.

FIG. 5A illustrates a path 500 according to an exemplary embodiment of the present disclosure. Path 500 includes one or more conductors 550 disposed between adjacent ground planes 505. Although FIG. 5A illustrates two ground planes 505.1 and 505.2, the path 500 can include additional ground planes, such as ground planes formed between the adjacent ground planes to enclose the conductors 550.

The path 500 can be an N-bit path having N conductors 550, where N is a positive integer. For ease of illustration and discussion, FIG. 5A illustrates three signal paths 550.1 to 550.3, but the path 500 can include (but is not limited to), for example, 64 conductors.

As illustrated in FIG. 5A, a line-to-ground capacitance $C_g$ can be formed between each conductor and an adjacent ground plane, and a coupling capacitance $C_c$ can be formed between adjacent conductors 550. The conductors 550 can be spaced from the ground planes and be spaced from an immediately adjacent conductor. Although the conductors 550 as illustrated have a rectangular shape, the conductors 550 can be other shapes (e.g., cylindrical) as would be understood by those skilled in the relevant arts.

In operation, the power consumption of the crossbar 120, 320 is a function of switching power, short-circuit power, and leakage power of the paths 350, 500. In an exemplary embodiment, the switching power consumption P satisfies the following Equation 1:

$$P = (C \times V^2 \times f)$$

where C is the total capacitance of the path (e.g., path 350, 500), V is the voltage, and f is the frequency. In an exemplary embodiment, the total capacitance C is a function of the line-to-ground capacitance $C_g$ and the coupling capacitance $C_c$.

In operation, the voltage and frequency can be determined by the power arbitration controller 105 and the power management controller 130 as discussed above. In an exemplary embodiment, the CPUs 115.1 to 115.D are each governed by the power arbitration controller 105 and the power management controller 130. As a result, the determined voltage and frequency are provided to each CPU 115. In this configuration, the each of the CPUs 115 will operate at the determined performance request (e.g., performance request 220) even if one or more of the CPUs 115 requests a lower voltage and/or frequency.

In an exemplary embodiment, to reduce power consumption, one or more paths 350 associated with the CPUs that have requested a lower operating voltage and/or frequency (but are operating at a larger voltage and/or frequency) can be serialized as described with reference to FIG. 4 and further described below with reference to FIG. 5B.

Figure 5B:
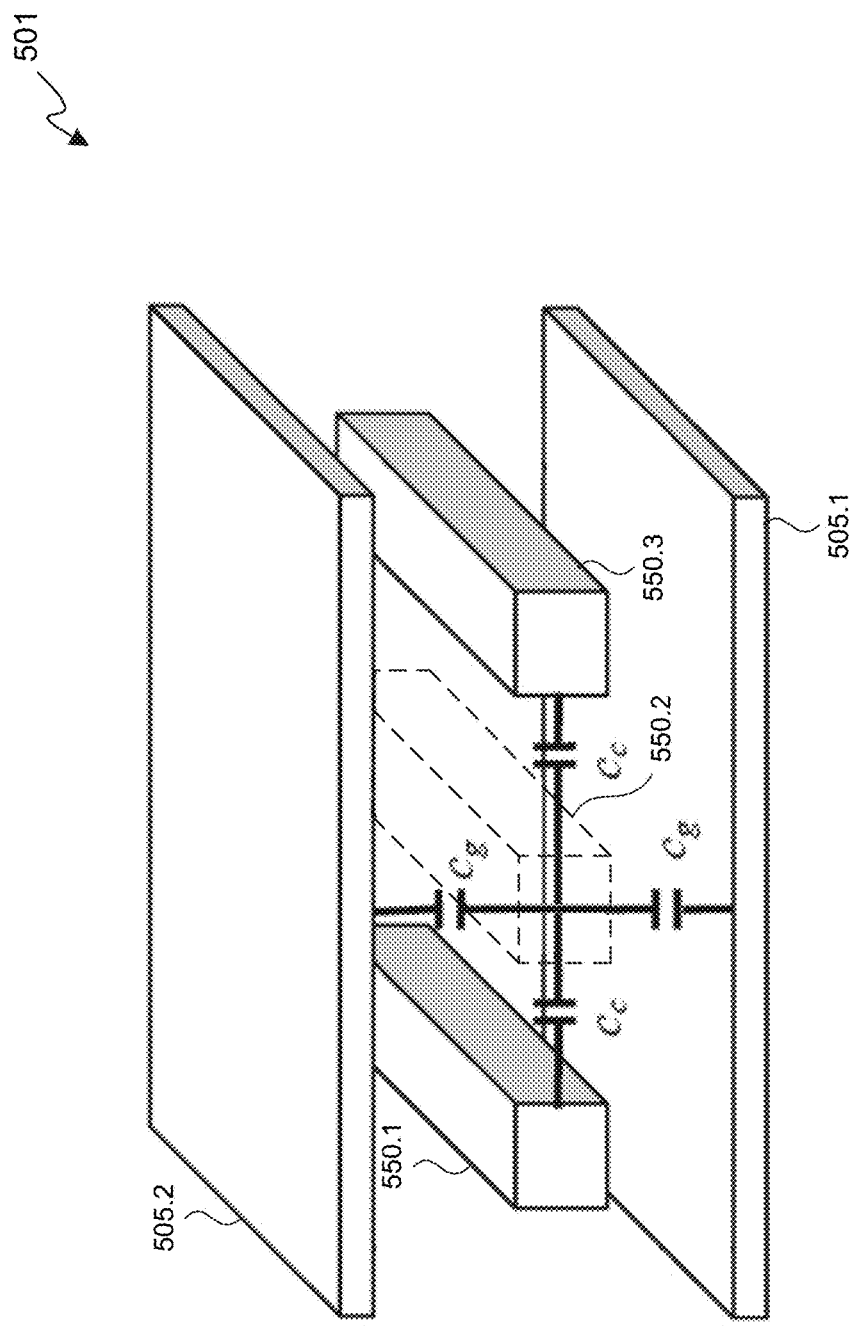
FIG. 5B illustrates a path according to an exemplary embodiment of the present disclosure.

FIG. 5B illustrates a path 501 according to an exemplary embodiment of the present disclosure. Path 501 is the path 500 illustrated in FIG. 5A but conductor 550.2 (shown in dashed lines) has been electrically disconnected/isolated. Some or all of the discussion of common elements of FIG. 5A may have been omitted for brevity.

In an exemplary embodiment, path 500 includes 64 conductors 550. By serializing the path 500 by a factor of two, the number of conductors 550 of the path 500 is reduced in half to 32 conductors 550 (e.g., 550.1, 550.3, 550.5, 550.7, etc.) as represented by path 501.

As illustrated in FIG. 5B, the conductor 550.2 has been isolated and is shown in dashed lines. The dashed lines represent that the conductor 550.2 has been electrically disconnected from the path 501. In this example, the coupling capacitance $C_c$ between the adjacent conductor 550.1 (referred to as $C_{c1}$) and the coupling capacitance $C_c$ between the other adjacent conductor 550.3 (referred to as $C_{c3}$) become electrically connected in series. As a result of the series connection, the overall coupling capacitance of the path 501 will be reduced. In an exemplary embodiment having three conductors, the resulting coupling capacitance $C_{c\_serialized}$ will be reduced and will satisfy the following Equation 2:

$$\frac{1}{C_{c\_serialized}} = \frac{1}{C_{c1}} + \frac{1}{C_{c3}}$$

Similarly, the line-to-ground capacitance $C_g$ between the ground plane 505.1 and the conductor 550.2 (referred to as $C_{g1}$), and the line-to-ground capacitance $C_g$ between ground plane 505.2 and the conductor 550.2 (referred to as $C_{g2}$) become electrically connected in series. As a result of the series connection, the overall line-to-ground capacitance of the path 501 will be reduced. In an exemplary embodiment, the resulting line-to-ground capacitance $C_{g\_serialized}$ will be reduced and will satisfy the following Equation 3:

$$\frac{1}{C_{g\_serialized}} = \frac{1}{C_{g1}} + \frac{1}{C_{g2}}$$

Because the total capacitance C (of Equation 1) is a function of the line-to-ground capacitance $C_g$ and the coupling capacitance $C_c$, a reduction in the overall coupling capacitance $C_{c\_serialized}$ and the line-to-ground capacitance $C_{g\_serialized}$ using serialization reduces the total capacitance C of Equation 1. By reducing the total capacitance C, the value of the switching power (i.e., the $C \times V^2 \times f$ of Equation 1) is reduced, thereby reducing the overall power consumption P.

Figure 6:
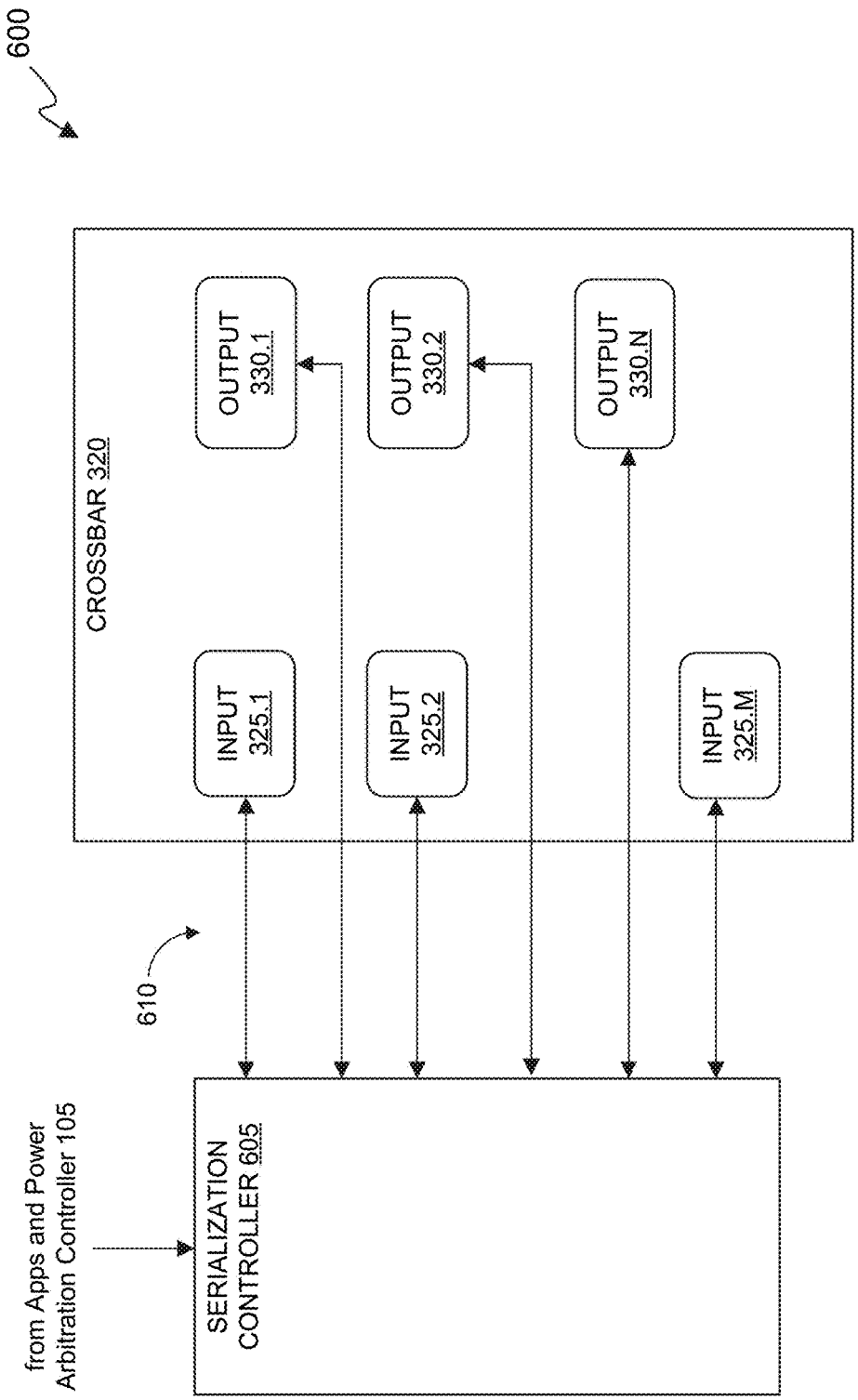
FIG. 6 illustrates a SOC according to an exemplary embodiment of the present disclosure.

FIG. 6 illustrates a SOC 600 according to an exemplary embodiment of the present disclosure. The SOC 600 can be similar to the SOC 300 illustrated in FIG. 3, and discussion of common features and operations may have been omitted for brevity. The SOC 600 can be an embodiment of the SOCs 100 and/or 300.

The SOC 600 can include a serialization controller 605 connected (e.g., communicatively and/or electrically coupled) to crossbar 320. The serialization controller 605 can include processor circuitry configured to generate serialization control signals 610 and provide the serialization control signals 610 to one or more of the inputs 325 (e.g., input stages) and/or outputs 330 (e.g. output stages) of the crossbar 320. In exemplary embodiments that include one or more serializers/de-serializers 405, 410, the serialization control signals 610 can be provided to the serializer/de-serializer 405 and/or the serializer/de-serializer 410 in addition to (or instead of) the inputs 325 and/or outputs 330.

In operation, the serialization control signals 610 enable/disable the serialization/deserialization of one or more paths 350 associated with the input 325 and output 330 (serializers/de-serializers 405, 410). For example, the input 325.1 and output 330.1 can receive serialization control signal(s) 610 that enable serialization of the path 350 between the input 325.1 and the output 330.1.

The serialization controller 605 can be configured to generate one or more serialization control signals 610 based on information received from one or more applications 110 and the power arbitration controller 105. The information from apps 110 can include identification information identifying one or more outputs 330 (and/or corresponding slave device 310) the application(s) 110 (e.g., master device(s) 305) intend to access. The information from power arbitration controller 105 can include serialization capability information that identifies which CPUs 115 are capable of serialization operations. For example, the CPUs 115 that are capable of serialization operations can be those CPUs 115 that have been provided a greater voltage and/or frequency than requested in their corresponding performance request 205, 210, 215 (e.g., their performance request was not selected by the power arbitration controller 105). The operation of the serialization controller 605 is described in detail with reference to FIGS. 7A-7C.

Figures 7A, 7B:
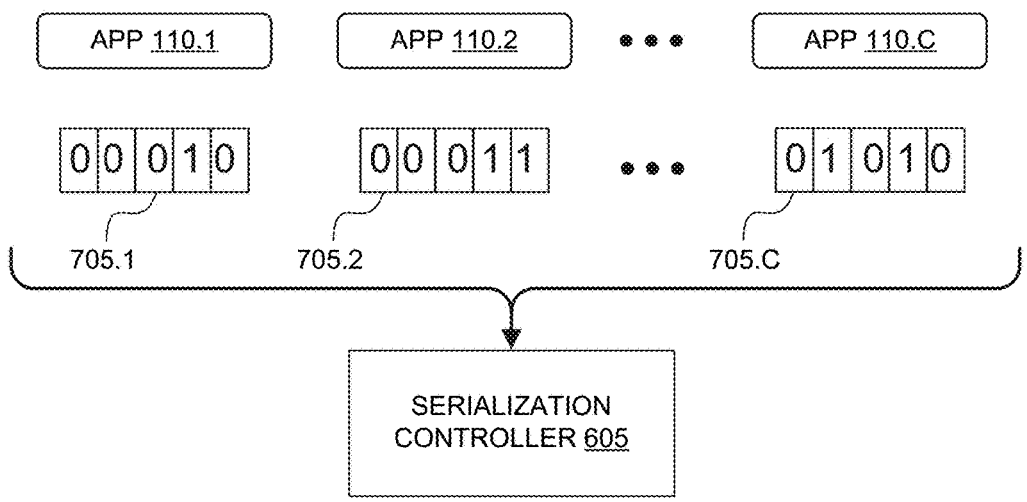
FIGS. 7A-7C illustrate the generation of serialization control signals according to exemplary embodiments of the present disclosure.
Figure 7C:
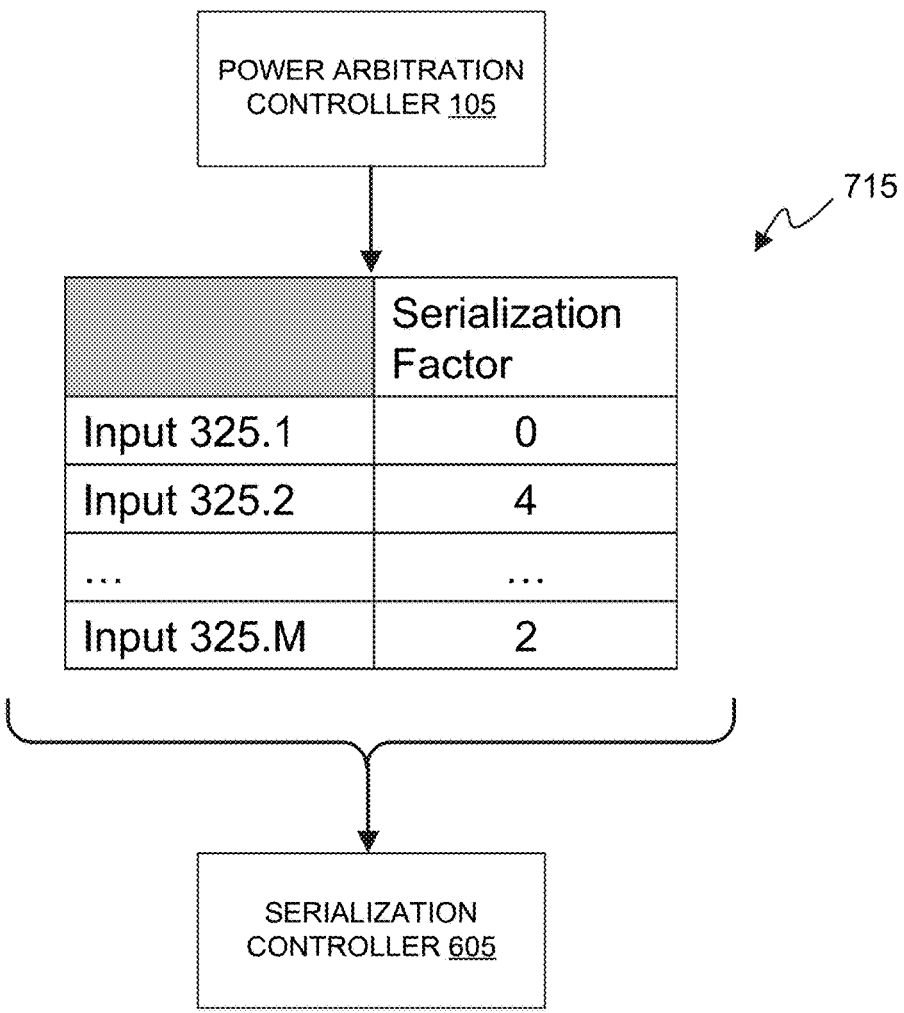

FIGS. 7A-7C illustrate the generation of serialization control signals 610 according to exemplary embodiments of the present disclosure. As illustrated in FIG. 7A, the applications 110.1 provide identification information identifying one or more outputs 330 the application(s) 110 (e.g., master device(s) 305) intend to access to the serialization controller 605. In an exemplary embodiment, the identification information can be bit masks 705. In this example, the application(s) 110 can generate a corresponding bit mask 705 that identifies which outputs 330 (and/or corresponding slave device 310). The bit masks 705 can include N bits corresponding to the N outputs 330 of the crossbar 320. For example, bit mask 705.1 includes a bit sequence "00010," which indicates that of the five outputs 330, the application 110.1 intends to access the second output 330.2. Similarly, the bit mask 705.2 includes a bit sequence "00011," which indicates that of the five outputs 330, the application 110.2 intends to access the first and second outputs 330.1 and 330.2.

FIG. 7B illustrates an output bit mask table 710 according to an exemplary embodiment of the present disclosure. In an exemplary embodiment, the serialization controller 605 can be configured to generate the output bit mask table 710 based on the bit masks 705 received from the applications 110. The output bit mask table 710 can be a collection of the bit sequences of the bit masks 705. In an exemplary embodiment, the output bit mask table 710 is a look up table. The output bit mask table 710 can be stored in memory 140 and/or within a memory of the serialization controller 605.

FIG. 7C illustrates a serialization factor table 715 and the operation of the power arbitration controller 105 according to an exemplary embodiment of the present disclosure. In an exemplary embodiment, the power arbitration controller 105 can be configured to determine which CPUs 115 (and corresponding inputs 325) are capable of serialization operations. In an exemplary embodiment, the power arbitration controller 105 can be configured to determine a serialization factor that identifies whether a CPU 115 is capable of serialization operations as well as the degree of serialization for the CPU 115. The power arbitration controller 105 can be configured to generate the serialization factor table 715 and provide the serialization factor table 715 to the serialization controller 605. In an exemplary embodiment, instead of including serialization factors, the serialization factor table 715 can include one or more bit values that correspond to the bit size in which the path 350 can be serialized to. The serialization factor table 715 can be stored in memory 140 and/or within a memory of the serialization controller 605. In an exemplary embodiment, the serialization factor table 715 is a look up table.

As illustrated in FIG. 7C, input 325.1 (and corresponding CPU 115) has been identified as incapable of serialization as represented by a serialization factor of zero. In this example, the input 325.1 can be associated with a CPU 115 that was provided with the voltage and/or frequency requested in their corresponding performance request. Conversely, input 325.2 and corresponding CPU 115 have been identified as being capable of serialization, and that a corresponding path 350 can be serialized by a factor of four. In this example, input 325.2 is associated with a CPU 115 that was provided with a voltage and/or frequency that was greater than the voltage and/or frequency requested in its corresponding performance request (e.g., CPU 115 that requested 2.5V and a frequency of 40 Hz but was provided with 5V and a frequency of 60 Hz based on the determined performance request 220). Here, the serialization factor identifies that the CPU 115 can operate using a reduced data throughput via its corresponding path 350 that is four times less than a normal (non-serialized) throughput. For example, if the CPU 115 will transmit 64 bits of data and 64 bits are transmitted per clock cycle on a 64 bit path 350, the CPU 115 (and its corresponding application 110) is operable to transmit the 64 bits of data over four clock cycles, where 16 bits of data are transmitted per clock cycle over a path 350 that has been serialized to reduce the conductors of the path 350 by a factor of four (e.g., to 16 bits). In this example, because the conductors have been reduced by a factor of four, the overall capacitance of the path 350 has been reduced, thereby reducing the power consumed by the path 350. This power consumption reduction is achieved while the associated CPU is operating at a larger voltage and/or frequency than that requested in its corresponding performance request.

In an exemplary embodiment, the serialization controller 605 is configured to generate the serialization control signals 610 based on the output bit mask table 710 and the serialization factor table 715. In operation, the serialization controller 605 can compare the values of the output bit mask table 710 with the values of the serialization factor table 715, and generate the serialization control signals 610 based on the comparison.

For example, the serialization controller 605 can determine the output stages 330 (and corresponding slave devices 310) that are accessed (or will be accessed) by only a single input 325 (and corresponding master device 305). As shown in FIG. 7B, the output bit mask table 710 indicates that the output 330.2 (and its corresponding slave device 310.2) will be accessed (or is accessed) by only the input 325.2 (and its corresponding master device 305.2). This is shown by the row of the table corresponding to the output 330.2 having only a "1" bit under the input 325.2 column.

The serialization controller 605 can also determine which inputs 325 (and corresponding CPU 115) are capable of serialization based on the serialization factor table 715. For example, as shown in FIG. 7C, the input 325.2 (and corresponding CPU 115) has been identified as being capable of serialization as indicated by a non-zero serialization factor. In this example, the input 325.2 can be serialized by a factor of four.

In this example, the serialization controller 605 can determine that the path 350 between the input 325.2 and the output 330.2 can be serialized based on the output 330.2 (and its corresponding slave device 310.2) being accessed by only the input 325.2 and input 325.2 being capable of serialization. In operation, the path 350 between the input 325.2 and the output 330.2 can be serialized by up to and including a factor of four. Based on this determination, the serialization controller 605 can generate serialization control signals 610 and provide the serialization control signals 610 to the serializer/de-serializer pairs 405, 410 associated with the input 325.2 and output 330.2 to control the serializer/de-serializer pairs 405, 410 to enable the serialization/deserialization of the path 350 by the serialization factor.

In an exemplary embodiment, the serialization operations are not limited to output stages 330 (and corresponding slave devices 310) that are accessed (or will be accessed) by only a single input 325 (and corresponding master device 305). For example, the serialization controller 605 can be configured to enable serialization if an output stage 330 (and corresponding slave device 310) is accessed (or will be accessed) by two or more inputs 325 (and corresponding master devices 305), and if the two or more inputs 325 (and corresponding CPUs 115) have been identified as being capable of serialization. In this example, the serialization controller 605 can control the serialization of the corresponding paths 350 based on the lowest serialization factor of the serialization factors associated with the two or more inputs 325 (and corresponding CPUs 115).

Figure 8:
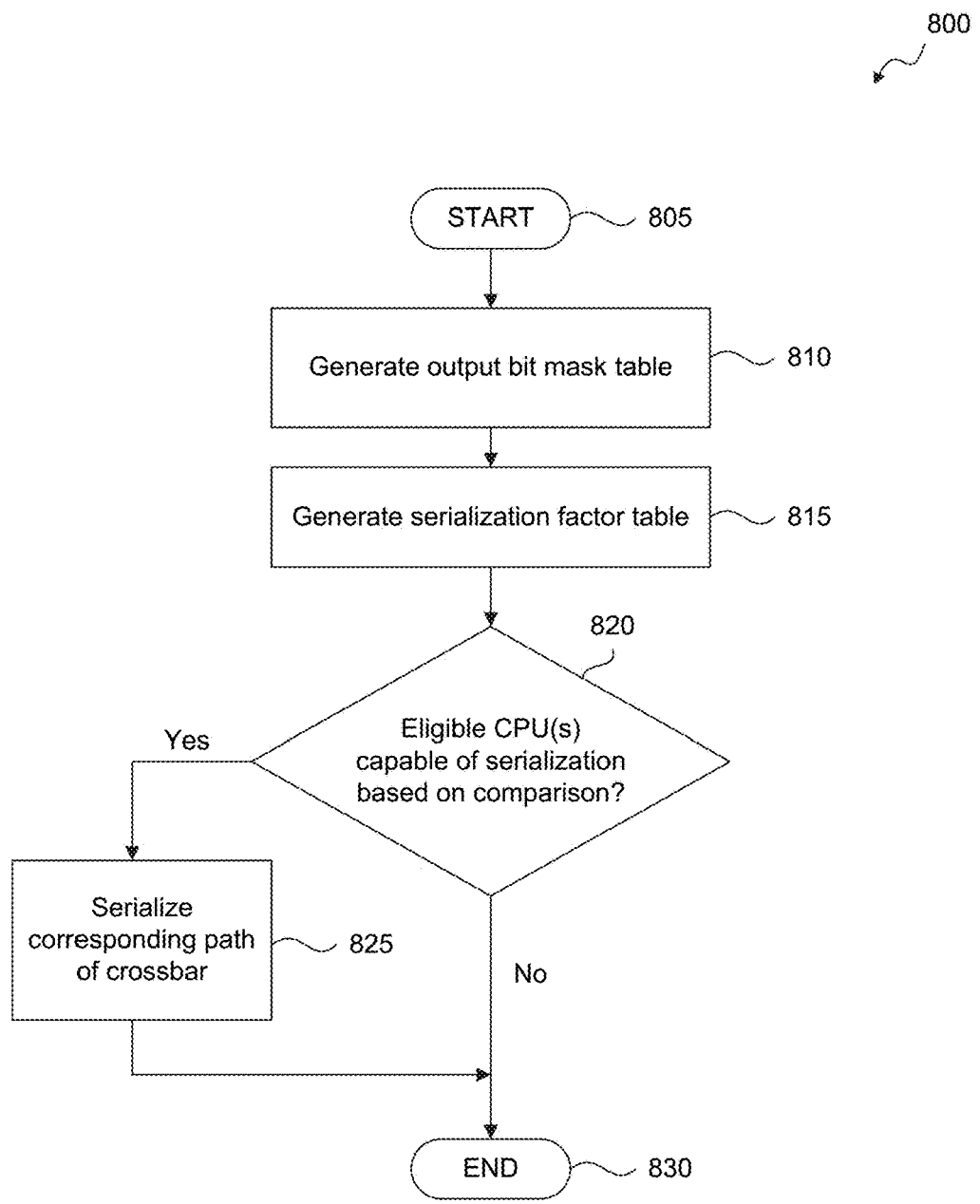
FIG. 8 illustrates a flowchart of a serialization method according to an exemplary embodiment of the present disclosure.

FIG. 8 illustrates a flowchart 800 of a serialization method according to an exemplary embodiment of the present disclosure. The flowchart is described with continued reference to FIGS. 1-7C. The steps of the method are not limited to the order described below, and the various steps may be performed in a different order. Further, two or more steps of the method may be performed simultaneously with each other.

The method of flowchart 800 begins at step 805 and transitions to step 810, where an output bit mask table is generated. In an exemplary embodiment, the serialization controller 605 can be configured to generate an output bit mask table 710 based on bit masks 705 received from the applications 110. For example, the serialization controller 605 can determine the output stages 330 (and corresponding slave devices 310) that are accessed (or will be accessed) by only a single input 325 (and corresponding master device 305) to generate the output bit mask table 710.

After steps 810, the flowchart 800 transitions to step 815, where a serialization factor table is generated. In an exemplary embodiment, the power arbitration controller 105 can be configured to determine which CPUs 115 (and corresponding inputs 325) are capable of serialization operations. For example, the power arbitration controller 105 can determine that a CPU 115 (and associated input 325) is capable of serialization operations if the CPU 115 has been provided with a voltage and/or frequency that was greater than the voltage and/or frequency requested in the CPU's corresponding performance request (e.g., CPU 115 that requested 2.5V and a frequency of 40 Hz but was provided with 5V and a frequency of 60 Hz based on the determined performance request 220). The power arbitration controller 105 can be configured to generate the serialization factor table 715 based on these determinations, and provide the serialization factor table 715 to the serialization controller 605.

After steps 815, the flowchart 800 transitions to step 820, where the output bit mask table 710 is compared with the serialization factor table 715. In an exemplary embodiment, the serialization controller 605 can compare the value of the output bit mask table 710 with values of the serialization factor table 715.

In an exemplary embodiment, serialization eligibility and capability is determined based on the comparison of the output bit mask table 710 with values of the serialization factor table 715. For example, the serialization controller 605 can compare the results of the determination of the output stages 330 (and corresponding slave devices 310) that are accessed (or will be accessed) by only a single input 325 with the determination of the CPUs 115 (and corresponding inputs 325) that have been provided a greater voltage and/or frequency than the voltage and/or frequency requested in the corresponding performance request.

If CPU is determined to be eligible and capable of serialization (Yes at step 820), the flowchart 800 transitions to step 825 where corresponding path(s) 350 of the crossbar 320 are serialized based on, for example, the serialization factor. In an exemplary embodiment, the serialization controller 605 determines if CPU(s) 115 are eligible and capable of serialization. In operation, the serialization controller 605 generates serialization control signals 610 and provides the signals to corresponding serializer/de-serializer pairs 405, 410 associated with the input 325 and output 330 corresponding to the eligible and capable CPU 115 to control the serializer/de-serializer pairs 405, 410 to enable the serialization/deserialization of the path 350 by the serialization factor.

Otherwise (No at step 820), as well as after step 825, the flowchart transitions to step 830 where the flowchart 800 ends. The flowchart 800 may be repeated one or more times.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to embodiments described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary embodiments described herein, processor circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

What is claimed is:

1. A method for reducing power consumption of a system communicating with a plurality of devices, the system including first and second devices of the plurality of devices, the second device being coupled to the first device via an interconnect, the method comprising:
   determining an amount of access to the second device by one or more of the plurality of devices; and
   serializing the interconnect coupling the first device with the second device based on the determined amount of access to the second device.

2. The method of claim 1, wherein the serializing of the interconnect is further based on a serialization capability of the first device.

3. The method of claim 2, further comprising determining the serialization capability of the first device.

4. The method of claim 3, wherein the determining the serialization capability of the first device comprises:
   determining a performance request associated with the first device;
   determining performance characteristics of the first device; and
   comparing the performance characteristics and the performance request.

5. The method of claim 3, wherein the performance request comprises at least one of a voltage and a frequency at which the first device intends to operate; and wherein the performance characteristics comprise at least one of a voltage and a frequency at which the first device operates.

6. The method of claim 5, wherein the first device is capable of serialization if the performance request is less than the performance characteristics.

7. The method of claim 3, wherein determining the serialization capability of the first device comprises determining a serialization factor associated with the first device.

8. The method of claim 1, wherein the determining the amount of access to the second device comprises:
   determining if the first device has sole access to the second device.

9. The method of claim 8, wherein the serializing of the interconnect is enabled if the first device has sole access to the second device.

10. The method of claim 1, wherein the interconnect is serialized if:
    the serialization capability indicates that a performance request associated with the first device is less than a performance characteristic of the first device; and
    the determined amount of access indicates that the first device has sole access to the second device.

11. The method of claim 1, wherein determining the amount of access to the second device by one or more of the plurality of devices is based on an output bit mask table.

12. A system on chip (SOC), comprising:
    a data bus including an input stage and an output stage, the input stage being coupled to the output stage via an interconnect;
    a serialization controller that is configured to generate a serialization control signal based on: (a) a serialization factor associated with a first device coupled to the input stage, and an output bit mask associated with the first device and a second device coupled to the output stage, or (b) one or more performance requests received from one or more applications; and
    a serializer disposed between the input stage and the output stage, the serializer being configured to serialize the interconnect that couples the input stage to the output stage based on the serialization control signal to serialize the coupling of the input stage to the output stage.

13. The SOC of claim 12, further comprising:
    a power arbitration controller configured to determine a performance request message based on one or more performance requests received by the power arbitration controller.

14. The SOC of claim 13, wherein the power arbitration controller is further configured to generate the serialization factor based on the one or more performance requests.

15. The SOC of claim 13, further comprising:
    a power management controller configured to generate a performance control signal based on the performance request message.

16. The SOC of claim 15, wherein the serialization controller is configured to generate the serialization control signal based on the performance control signal.

17. The SOC of claim 12, wherein the serialization controller is configured to generate the serialization control signal based on the serialization factor and the one or more performance requests.

18. The SOC of claim 12,
    wherein the serialization controller is configured
    to generate the serialization control signal based on:
       a comparison of a performance characteristic of the first device and a performance request associated with the first device, and
       an amount of access to the second device by another device associated with another input stage of the data bus.

19. The SOC of claim 12, wherein the serialization controller is configured to compare the serialization factor with the output bit mask to generate the serialization control signal.

* * * * *